April 17, 1928.  
L. C. AMENT  
1,666,064  
LIQUID DISPENSING PUMP  
Filed Sept. 9, 1927
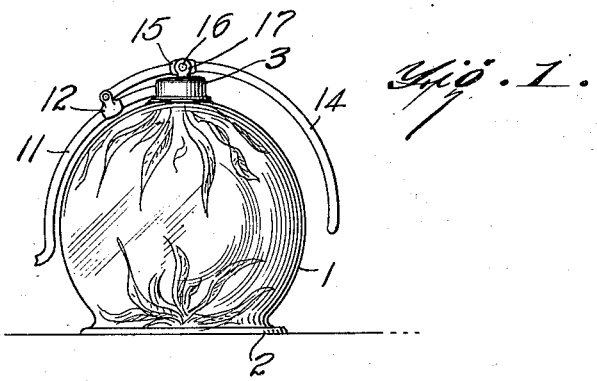
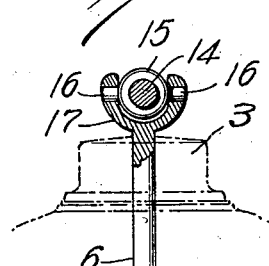
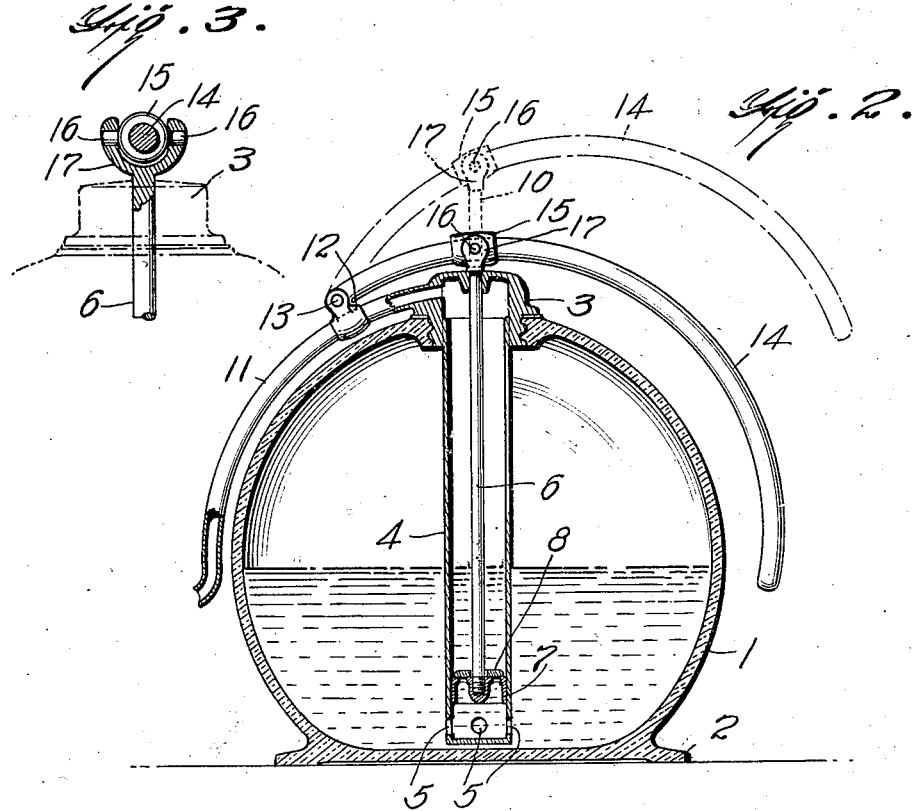
Inventor  
LUCY COTTON AMENT,  
By Spear, Middleton, Donaldson & Hall  
Attorneys Patented Apr. 17, 1928.

1,666,064

UNITED STATES PATENT OFFICE.

LUCY COTTON AMENT, OF NEW YORK, N. Y.

LIQUID-DISPENSING PUMP.

Application filed September 9, 1927. Serial No. 218,510.

This invention relates to a novel liquid dispensing pump such as may be used on soda fountains or in any place where it is desired to remove from a reservoir quantities of the liquid contained therein.

The principal object of the invention is the provision of a pump of the type described which will be attractive in appearance, which may be readily and quickly adjusted to change the leverage on the handle and which may be used to dispense varying quantities of a liquid.

These and other objects of the invention will appear as the description proceeds.

To this end the invention consists in the provision of a container of glass or other suitable material mounted upon a base and within which is located a pump barrel which receives liquid from the container. Reciprocably mounted within the pump barrel is a piston or plunger having valves therein to permit one way passage of the fluid. Secured in the top of the container is an intermediate well portion which receives the fluid from the pump barrel, which well is closed by a cap through which the pump plunger projects. A spout is secured to the wall of the intermediate well which spout conducts the fluid to any desired location. Upon the spout I provide a pivot block engaging the spout in a slidable manner, but so that it may be more or less rigidly located in any position on the spout. This block carries the pivoted end of a handle which handle engages the top of the piston rod in a universal joint so that up and down movement of the handle will permit the piston rod to move in a vertical direction only and without binding. In other words, the handle engages the piston rod in a slipped or sliding connection while the pivoted end of the handle engages the spout in a rigid manner, although capable of being moved to various positions.

The invention further consists in the novel arrangement, construction and combination of parts hereinafter described and shown in the accompanying drawings, in which:—

Figure 1 is a side elevational view of the apparatus embodying my improvements.

Figure 2 is a vertical central view of the same shown in section.

Figure 3 is a detail showing the pivotal connection between the handle and the piston rod shown in section.

Referring now to the embodiment illustrated, I have shown a container at 1 of glass or other suitable material and of any desired shape which in this case may advantageously be that of a sphere. A base 2 supports the container.

Screwed into the top of the container 1 is a well 3 from the bottom of which depends a pump barrel 4 having apertures 5 at the bottom thereof allowing communication between the interior of the barrel 4 and the interior of the reservoir 1.

A piston rod 6 is provided for reciprocation within the pump barrel 4 to the end of which is attached a plunger 7 having the usual one way valves 8 therein. Downward movement of the piston allows the liquid within the container to flow above the piston, but when this latter portion is moved upwardly the valves 8 close and the liquid above the plunger 7 is lifted into the well 3 in the well known manner.

The well 3 is closed by a cap 9 apertured to permit the upper end 10 of the piston rod 6 to extend therethrough. A spout 11 communicating with the well 3 allows liquid lifted into the well to flow out through this opening.

Frictionally engaging the spout 11 is a bearing block 12 gripping the spout so that the block will remain in any desired position, but which may be manually slid up or down as desired. The block 12 carries the pivoted end 13 of a handle 14. This handle passes through a pivoted block 15 carried upon pins 16 in the end of a yoke 17 mounted upon the top 10 of the piston rod.

It will be noted that as the handle 14 is moved up and down, corresponding vertical movement will be imparted to the piston with a result that liquid will be lifted from within the container into the well 3 and from there out of the spout 11. In this movement of the piston, the piston rod 6 has only a vertical reciprocation and due to the fact that a sliding connection is provided between the top of the rod 10 and the handle 14 the parts will not bind at any position of the handle, but the handle will readily slip through the block 15.

Inasmuch as the end of the handle is pivoted in the movable bearing 12, I am able to secure various adjustments of the handle both to increase or decrease the leverage, and also to change the vertical movement of the piston in regard to movement of the handle itself.

This is of advantage particularly when a change in liquid has been made from thin to thick where it would be desirable to increase the amount of leverage secured by use of this handle. It will be obvious that the nearer the bearing 12 is to the well 3 the greater the leverage on the handle.

The fact that the well 3 is provided as an enlargement at the top of the pump barrel 4 I am able to use this as a filling funnel when replenishing the container.

It will be obvious that the container may be decorated or made in any desired shape to particularly adapt it to the use to which it is to be put.

What I claim is:

1. In combination, a liquid container, a pump therein for removing the contents, a spout for receiving the contents from the pump and a pivoted handle for operating the pump, the handle being slidably fulcrumed to the spout.

2. In combination, a tank adapted to receive a liquid, a pump barrel extending within the tank and having an aperture in the bottom thereof, a plunger within the barrel for lifting the contents from the container, a spout receiving the contents from the pump barrel, a handle attached to the plunger and slidably engaging the spout for reciprocating the plunger.

3. In combination, a tank adapted to receive a liquid, a pump barrel extending within the tank and having an aperture in the bottom thereof, a plunger within the barrel for lifting the contents from the container, a spout receiving the contents from the pump barrel, a handle attached to the plunger and slidably engaging the spout for reciprocating the plunger, and a well between the pump barrel and the spout receiving the contents from the barrel and delivering the same to the spout.

4. A liquid dispensing container comprising a tank, means for lifting the liquid within the container to a point without the container, a spout receiving the liquid thus pumped and delivering the same to any desired place, a pivoted handle for operating the liquid lifting means, said handle being pivoted to a bearing block, said block being movably mounted upon the spout.

In testimony whereof, I affix my signature.

LUCY COTTON AMENT.